United States Patent [19]

Diveley

[11] 3,855,105

[45] Dec. 17, 1974

[54] THIOPHOSPHORYLATING A SATURATED HYDROCARBON GROUP

[75] Inventor: William R. Diveley, Oakwood Hills, Del.

[73] Assignee: Hercules Incorporated, Wilmington, Del.

[22] Filed: June 16, 1969

[21] Appl. No.: 833,741

Related U.S. Application Data

[63] Continuation-in-part of Ser. No. 514,652, Dec. 17, 1965, abandoned.

[52] U.S. Cl. ...... 204/162 R, 204/158 R, 260/329 R, 260/329 P, 260/340.6, 260/347.2, 260/958, 260/963, 260/971
[51] Int. Cl. ................................................. B01j 1/10
[58] Field of Search ............ 204/162, 158; 260/329, 260/340.6, 347.2, 958, 963, 971

[56] References Cited
UNITED STATES PATENTS
3,256,370   6/1966   Fitch et al. .......................... 260/972

3,284,540   11/1966   D'Alelio .............................. 260/869

Primary Examiner—Benjamin R. Padgett
Attorney, Agent, or Firm—George H. Hopkins

[57] ABSTRACT

Disclosed is a process for making certain organo thiophosphates and dithiophosphates, a number of which have utility as insecticides. The process comprises effecting by free radical catalysis at about 0°–150°C. reaction of an organic compound characterized by a saturated carbon with at least one hydrogen replaceable under free radical conditions, and halo-thiophosphate of the formula:

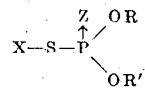

wherein X is a halo radical, Z is selected from the group consisting of the oxo and thioxo radicals, and R and R' are organic radicals.

24 Claims, No Drawings

THIOPHOSPHORYLATING A SATURATED HYDROCARBON GROUP

The application is a continuation-in-part of the copending application, Ser. No. 514,652, filed Dec. 17, 1965, for Method Of Thiophosphorylation Of Organic Compounds and now abandoned.

This invention is in the chemical arts. It resides in that part of organic chemistry pertaining to organic thio and dithiophosphates.

In summary, this invention in one aspect comprises a process for the thiophosphorylation of organic compounds characterized by a saturated carbon having at least one hydrogen replaceable under free radical conditions. As used in this specification, thiophosphorylation means the substitution of a thiophosphate radical, a dithiophosphate radical or both radicals for hydrogen in a molecule.

The process of this invention comprises effecting by free radical catalysis at about 0°–150°C. reaction of such a compound and a halothiophosphate of the formula:

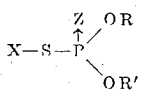

wherein X is a halo radical, Z is selected from the group consisting of the oxo and thioxo radicals, and R and R' are each organic radicals. The overall reaction that takes place is expressed by the following equation:

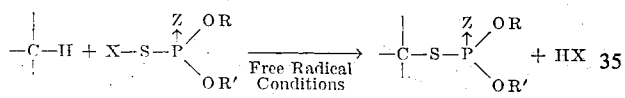

wherein

depicts a saturated carbon in a molecule, which carbon has a hydrogen that is replaceable under free radical conditions.

The organic compounds that are thiophosphorylated by the process of this invention comprise compounds represented by the formulas:

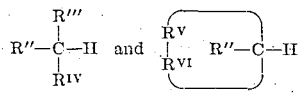

wherein H is replaceable under free radical conditions, R'', R''' and R'ᵛ are selected from the group consisting of the hydrogen radical and the aliphatic, cycloaliphatic, aromatic and heterocyclic, unsubstituted and substituted radicals, and Rᵛ and Rᵛ' are organic moieties. While under the concepts of this invention the organic compounds to be thiophosphorylated must have at leļast one saturated carbon with at least one hydrogen radical replaceable under free radical conditions, the process of this invention encompasses organic compounds having a saturated carbon with two or more hydrogen radicals replaceable under free radical conditions, and organic compounds having two or more saturated carbons, each of which has one or more hydrogen radicals replaceable under free radical conditions. In general, a saturated carbon with a hydrogen radical replaceable under free radical conditions undergoes substitution halogenation under free radical conditions when contacted with chlorine or bromine. If a saturated carbon with a hydrogen radical results in bromine decolorization in the presence of light, but not in the dark, with formation of hydrogen bromide, the hydrogen radical is replaceable under free radical conditions.

Examples of an organic compound containing a saturated carbon with a hydrogen radical replaceable under free radical conditions include:

Alkane Series
 Hydrocarbons
  Methane, ethane, propane, butane, isobutane, pentane, isopentane, neopentane, hexane, 2-methylpentane, 3-methylpentane, 2,2-dimethylbutane, 2,3-dimethylbutane, heptane, 2,4-dimethyl pentane, octane, docecane, kerosene, paraffin, polyethylene, polypropylene, and the like,
 Ethers
  Diethyl ether, dibutyl ether, polyoxyethylene, polyoxypropylene, and the like,
 Acids, Anhydrides, Esters, Amides and Imides
  Acetic acid, methyl acetate, acetic anhydride, adipic acid, dimethyl adipate, stearic acid, tristearin, stearic anhydride, glutaric acid, glutaric anhydride, poly(methyl methacrylate), ethyl pivalate, N-methylphthalimide, N,N-dimethylpivalamide, and the like,
 Nitro-derivatives
  Nitromethane, nitroethane, and the like,
 Halo-derivatives
  1,4-dichlorobutane, chlorinated paraffin, butyl chloride, and corresponding fluoro, bromo and iodo compounds, and the like, Aralkane Series
 Hydrocarbons
  Toluene, cumene, cymenes, xylenes, durene, diisopropylbenzene, triisopropylbenzene, mesitylene, α-methylnaphthalene, β-methylnaphthalene, polystyrene, dibenzyl, and the like,
 Ethers
  Benzyl ethyl ether, dibenzyl ether, and the like,
 Acids, Anhydrides, Esters, Amides and Imides
  Phenylacetic acid, methyl benzoate, methyl phenylacetate, α and β-naphthylacetic acids, o, m, and p-methyl toluates N,N-dimethyl o, m, and p-toluamide, N,N-dimethyl acetamide, phenylacetic anhydride, N-methylphthalimide, and the like,
 Nitro derivatives
  Nitrophenylacetic acids (o-, m- and p-), nitrotoluene (o-, m- and p-), trinitrotoluene, and the like,
 Halo derivatives
  p-chlorotoluene, chlorocumenes, chlorocymenes, and corresponding fluoro, bromo and iodo compounds, and the like, Alicyclic Series
 Hydrocarbons
  Cyclopentane, methylcyclopentane, cyclohexane, methylcyclohexane, dimethylcyclohexanes, pinane, trimethylcyclohexanes, camphane, p-menthane, cyclooctane, decahydronaphthalene, tetrahydronaphthalene, norbornane, tetrahydrodicyclopentadiene, adamantane, and the like, Halo-derivatives Chloropinanes, chlorocamphanes, and corresponding fluoro, bromo and iodo compounds, and the like, Heterocyclic Series 2-methylthiophene, 3-methylthiophene, 2-methylfuran, 3-methylfuran, tetrahydrothiophene, tetrahydrofuran, dioxane, dithiane, N,N'-dimethylpiperazine, and the like. As is evident from the foregoing, the process of this invention has broad scope. Not only are monomeric organic compounds thiophosphorylated thereby, but also polymeric organic compounds are thiophosphorylated thereby.

Regarding the thiophosphorylating agent of this invention, which is the halothiophosphate of the formula:

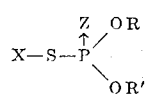

examplels of X comprise the fluoro, chloro, bromo and iodo radicals with the chloro radical usually being preferred. R and R' are organic radicals that can be the same or different. Examples of such organic radicals include unsubstituted and substituted hydrocarbon radicals, and unsubstituted and substituted heterocyclic radicals. Preferred hydrocarbon radicals include the alkyl, cycloalkyl, aryl, alkaryl and aralkyl, unsubstituted and substituted radicals. Particularly preferred are the $C_1-C_7$ alkyl radicals such as, for example, the methyl, ethyl, propyl, isopropyl, butyl, isobutyl, t-butyl, pentyl (and its isomers), hexyl (and its isomers), and heptyl (and its isomers) radicals. The thiophosphorylating agent can be made by a number of known procedures. When Z is the oxo radical one such procedure is that of Michalski, Chem. Abstr. 60, 9135, (1964), which is based on the following reaction:

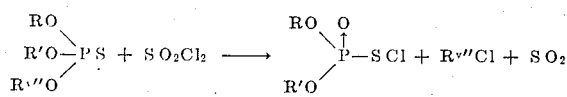

wherein R''' is an organic radical that can be the same as or different from either one or both of R and R' When Z is the thioxo radical one such procedure is that of Almasi and Paskucz Chem. Ber. 98, 613, (1965).

The quantity of thiophosphorylating agent of this invention relative to the organic compound to be thiophosphorylated is generally such as to enable the desired extent of thiophosphorylation to be accomplished. In this connection it should be noted that in the case of unsaturated hydrocarbons and their derivatives the thiophosphorylating agent of this invention reacts under the conditions of the process of this invention not only with saturated carbons with hydrogen radicals replaceable under free radical conditions, but also with unsaturated carbons. Moreover, the thiophosphorylating agent under the conditions of the process of this invention reacts with basic amino groups in addition to reaction with saturated carbons with hydrogen radicals replaceable under free radical conditions. Hence, these other reactions should be taken into account in determining the quantity of thiophosphorylating agent to use in practicing the process of this invention.

In the process of this invention the organic compound and the thiophosphorylating agent are admixed at 0°–150°C., preferably at 50°–80°C. A normally liquid reaction medium is not necessary, but is desirable particularly when the organic compound at optimum reaction temperatures is a solid or, if liquid, does not function as a good liquid reaction medium. When a liquid reaction medium is used, it preferably is not readily thiophosphorylated under the particular reaction conditions selected. Chloroform is a suitable liquid reaction medium because it is not readily thiophosphorylated under the conditions of the process of this invention. For the same reason, carbon tetrachloride is also a suitable liquid reaction medium. In any event the thiophosphorylation is carried out in the absence of water.

Reaction of the thiophosphorylating agent and saturated carbons with hydrogen radicals replaceable under free radical conditions is effected by free radical catalysis. This kind of catalysis is achieved in some embodiments of the process of this invention by exposing to ultraviolet light the mixture of organic compound and thiophosphorylating agent. In other embodiments of the process of this invention it is achieved by admixing with the mixture free radical generating material. This is material which upon the application of heat, ultraviolet light or both heat and ultraviolet light reacts to form free radicals. Such material comprises one or more compounds having this capability. Examples of such a compound include organic peroxides of all kinds, e.g., benzoyl peroxide, cumyl peroxide, perbenzoic acid, and the like, and inorganic compounds such as persulfates and peroxides of metals. In still other embodiments of the process of this invention both ultraviolet light and free radical generating material are employed.

The process of this invention is generally carried out under atmospheric pressure. However, carrying it out under subatmospheric and superatmospheric pressures are within the broader concepts of this invention.

The reaction time employed in the process of this invention depends upon the organic compound being thiophosphorylated. In some embodiments reaction and its completion occur almost instantaneously. In other embodiments reaction is slow and substantial completion of the reaction can take up to as much as a week. Generally, however, in such embodiments, the reaction time is in a range from about 1 hour to about 24 hours with about 1 hour to about 10 hours being preferred. The thiophosphorylating agent generally has a characteristic color which is different from the color of the thiophosphorylated compound formed in the reaction. Consequently, in many embodiments of the process of this invention the progress of the reaction can be followed by observation of the color of the reaction mixture. Also, in a number of these and other embodiments the progress of the reaction can be followed by the rate of evolution of hydrogen halide formed in the reaction.

Isolation of thiophosphorylated organic compounds from the reaction mixture is effected by conventional ways and means. In one procedure, for instance, the liquid reaction medium and excess organic compound are removed by aspiration or distillation, and the material that remains is distilled or topped in vacuo.

The thiophosphorylated organic compounds obtained by the process of this invention are useful compounds. The thiophosphorylated monomeric and low polymeric (dimeric, trimeric, tetrameric, etc.) organic compounds are useful in general as insecticides, as lubricant additives (antioxidants, corrosion inhibitors, sludge dispersants, extreme pressure agents, and the like), and as intermediates for the synthesis of other useful compounds.

The thiophosphorylated, so-called high polymers such as, for example, normally solid polyethylene, normally solid polypropylene, normally solid polyoxyethylene, normally solid polyoxypropylene, and the like, by the process of this invention give modified polymers that are more receptive to dyes, that can be crosslinked, that can be bonded to various substrates, that can more readily be graft polymerized with various monomers, that have increased oxidative stability, and that have greater flame resistance.

This invention in another aspect comprises new and useful groups of compounds. These groups of compounds, and examples of specific compounds in the groups, are listed as follows: O,O-Di($C_1$–$C_7$ alkyl) S-($C_1$–$C_7$ alkylbenzyl) phosphorothioates and dithioates.

O,O-Diethyl S-(2-methylbenzyl) phosphorothioate
O,O-Diethyl S-(3-methylbenzyl) phosphorothioate
O,O-Diethyl S-(4-methylbenzyl) phosphorothioate
O,O-Dimethyl S-(2-methylbenzyl) phosphorodithioate The first, second and fourth specific compounds are useful as insecticides and the third is useful as a lubricant additive. O,O-Di($C_1$–$C_7$ alkyl) S-($C_3$–$C_{18}$ cycloalkyl) phosphorothioates and dithioates O,O-Diethyl S-cyclohexyl phosphorothioate
O,O-Diethyl S-cyclopentyl phosphorothioate
O,O-Dimethyl S-cyclobutyl phosphorodithioate All of these specific compounds are useful as lubricant additives. O,O-Di($C_1$–$C_7$ alkyl) S-norbornyl phosphorothioates and dithioates O,O-Diethyl S-norbornyl phosphorothioate
O,O-Dimethyl S-norbornyl phosphorodithioate These specific compounds are useful as insecticides. O,O-Di($C_1$–$C_7$ alkyl) S-(2-furanylmethyl) phosphorothioates and dithioates O,O-Diethyl S-(2-furanylmethyl) phosphorothioate
O,O-Dimethyl S-(2-furanylmethyl) phosphorodithioate These specific compounds are useful as insecticides. O,O-Di($C_1$–$C_7$ alkyl) S-(acetoxymethyl) phosphorothioates and dithioates O,O-Diethyl S-(acetoxymethyl) phosphorothioate
O,O-Dimethyl S-(acetoxymethyl) phosphorodithioate These specific compounds are useful as insecticides. O,O-Di($C_1$–$C_7$ alkyl) thio and dithiophosphorylated chlorinated camphene O,O-Diethyl thiophosphorylated 60–72 weight % chlorinated camphene
O,O-Dimethyl dithiophosphorylated 60–72 weight % chlorinated camphene These specific compounds are useful as insecticides.

O,O-Di($C_1$–$C_7$ alkyl) S-(2-carboxy-2-methylpropyl) phosphorothioates and dithioates.

O,O-Diethyl S-(2-carboxy-2-methylpropyl) phosphorothioate
O,O-Dimethyl S-(2-carboxy-2-methylpropyl) phosphorodithioate These specific compounds are useful as insecticides.

These compounds are generally normally liquid. They are made by the process of this invention.

The best mode now contemplated of carrying out this invention is illustrated by the following examples of various aspects of this invention, which include specific embodiments of the invention. The invention is not limited to these specific embodiments. In the examples all percentages are by weight, unless otherwise expressly indicated. In addition, all parts by weight are expressed as "w," all parts by volume are expressed as "v," and all parts by weight (w) and all parts by volume (v) bear the same relationship as the kilogram to the liter.

EXAMPLE 1

This example illustrates how to make O,O-diethyl S-chlorophosphorothioate, a thiophosphorylating agent employed in preferred specific embodiments of the process of this invention.

Sulfuryl chloride (27.0w) is added dropwise over about 30 minutes under anhydrous conditions to well-stirred mixture of O,O,O-triethyl phosphorothioate (39.6w) and benzene 75 v) established and maintained at −5° – 0°C. The reaction mixture thus formed is maintained at −5° – 0°C. for 15 minutes, and then permitted to warm to 20°–25°C. Benzene is removed by aspiration, and the residue is distilled in vacuo. The desired product (36.4w) is collected at 62°–63°C. at a pressure of 0.3 millimeter of mercury. This product, consisting essentially of O,O-diethyl S-chloro phosphorothioate, tpyically is a yellow liquid. It is hereinafter referred to as Example 1 product.

EXAMPLE 2

This example illustrates the product of O,O-diethyl S-benzyl phosphorothioate by a preferred specific embodiment of the process of this invention.

Toluene (36.8w) and carbon tetrachloride (125 v) are charged to a reactor. While the resulting mixture is stirred, it is illuminated with ultraviolet light and heated to reflux temperatures. While a stream of nitrogen is passed slowly through the reactor, a solution of Example 1 product (15.34 w) in carbon tetrachloride (25 v) is added dropwise to the mixture over a period of 1 hour. The temperature is maintained at 65°–80°C. Soon after addition of the solution is started, hydrochloric acid copiously evolved from the resulting reaction mixture. For quite some time after the addition of the solution is started, its yellow color instantly disappears upon mixing with the water white reaction mixture, but as the addition proceeds, this no longer occurs and the reaction mixture acquires a light yellow color. Illumination of the reaction mixture with ultraviolet light is continued for two hours after completion of the addition of the solution. Typically at this time a few drops of the reaction mixture added to a 10% aqueous potassium iodide solution (3v)-carbon tetrachloride (3v) mixture fails to liberate iodine, thereby indicating substantially complete consumption of O,O-diethyl S-chloro phosphorothioate, and thus substantial completion of the reaction.

The carbon tetrachloride is removed by aspiration and the residue distilled in vacuo. After discarding a small forerun, a light tan liquid fraction (13.9 w) is collected at 125°–132°C. at a pressure of 0.4 millimeter of mercury.

This fraction is redistilled and the desired product, a water-white liquid (10.75 w), is collected at 116°–120°C. at a pressure of 0.1 millimeter of mercury. This product consists essentially of O,O-diethyl S-benzyl phosphorothioate. It typically analyzes: S = 13.0%, P = 12.6% (Calculated: S = 12.3%, P = 11.9%).

This product is useful as an insecticide and as a fungicidal.

EXAMPLE 3

This example illustrates the making of O,O-diethyl S-benzyl phosphorothioate by another preferred specific embodiment of the process of this invention.

The reactants, quantities of reactants, reaction procedure and product isolation procedure of Example 2 are the same, except that ultraviolet light illumination is omitted while benzoyl peroxide (0.05 w) is added to the initial mixture of toluene and carbon tetrachloride prior to adding the solution of O,O-diethyl S-chlorophosphorothioate and carbon tetrachloride. The results typically are substantially the same as in Example 2.

EXAMPLE 4

This example illustrates O,O-diethyl S-(2-methylbenzyl) phosphorothioate and its synthesis by a preferred specific embodiment of the process of the invention.

Following the Example 2 reaction procedure and the Example 2 product isolation procedure, but omitting the redistillation step, o-xylene (53 w) in carbon tetrachloride (100 v), and Example 1 product (17.5 w) in carbon tetrachloride (25 v) are reacted, and the desired end product (18.3 w) collected at 128°–140°C. at a pressure of 0.2 millimeter of mercury. The product, typically a light tan liquid, consists essentially of O,O-diethyl S-(2-methylbenzyl) phosphorothioate. A typical analysis of the product is: S = 12.0%, Cl = 0.33% (Calculated: S = 11.7%, Cl = 0.0%).

This product is useful as an insecticide.

EXAMPLE 5

This example illustrates O,O-diethyl S-(3-methylbenzyl) phosphorothioate, and its preparation by a preferred specific embodiment of the process of this invention.

Following the reaction and product separation procedures of Example 4, m-xylene (53 w) in carbon tetrachloride (100 v), and Example 1 product (17.5 w) in carbon tetrachloride (25 v) are reacted, and the desired end product (16.4 w), which distills at 128°–134°C. at 0.15 millimeter of mercury pressure, is obtained. This product, typically a light pink liquid, consists essentially of O,O-diethyl S-(3-methylbenzyl) phosphorothioate. A typical analysis of this product is: S = 12.2%, Cl = 0.29% (Calculated: S = 11.7%, Cl = 0.0%).

This product is useful as an insecticide.

EXAMPLE 6

This example pertains to O,O-diethyl S-(4-methylbenzyl) phosphorothioate, and its production by a preferred specific embodiment of the process of this invention.

By the reaction and product separation procedures of Example 4, p-xylene (53 w) in carbon tetrachloride (100 v), and Example 1 product (18 w) in carbon tetrachloride (25 v) are reacted, and the desired end product (21.4 w), which distills at 128°–135°C. at 0.15 millimeter of mercury pressure is obtained. This product, typically a tan liquid analyzing: S = 12.3% (Calculated: S = 11.7%) consists essentially of O,O-diethyl S-(4-methylbenzyl) phosphorothioate.

This product is useful as a lubricant additive.

EXAMPLE 7

This example illustrates O,O-diethyl S-cyclohexyl phosphorothioate and its synthesis by a preferred specific embodiment of the process of this invention.

Following the Example 4 reaction and product separation procedures, cycohexane (42 w) in carbon tetrachloride (125 v), and Example 1 product (18.0 w) in carbon tetrachloride (25 v) are reacted, and the desired end product (8.75 w), boiling at 105°–115°C. at 0.15 millimeter of mercury pressure is obtained. This product, typically a water-white liquid analyzing: S = 13.2%, P = 12.8% (Calculated: S = 12.7%, P = 12.3%), consists essentially of O,O-diethyl S-cyclohexyl phosphorothioate.

This product is useful as a lubricant additive.

EXAMPLE 8

O,O-Diethyl S-cyclopentyl phosphorothioate and its synthesis by a preferred specific embodiment of the process of this invention are illustrated by this example.

Following the Example 4 reaction and product separation procedures, cyclopentane (35 w) in carbon tetrachloride (125 v), and Example 1 product (18.5 w) in carbon tetrachloride (25 v) are reacted, and the desired end product (12.0 w), distilling at 102°–107°C. at 0.5 millimeter of mercury pressure, is obtained. This product, typically a tan liquid analyzing: S = 13.8%, P = 13.4% (Calculated: S = 13.4%, P = 13.0%), consists essentially of O,O-diethyl S-cyclopentyl phosphorothioate.

This product is useful as a lubricant additive.

EXAMPLE 9

This example illustrates O,O-diethyl S-norbornyl phosphorothioate, and its production by a preferred specific embodiment of the process of this invention.

Following the Example 4 reaction and product separation procedures, norbornane (48.0 w) in carbon tetrachloride (125 v), and Example 1 product (18.8 w) in carbon tetrachloride (25 v are reacted, and the desired end product (9.6 w), distilling at 106°–125°C. at 0.15 millimeter of mercury pressure is obtained. This product, typically a yellow liquid analyzing: S = 13.0%, P = 12.7% (Calculated: S = 12.1%, P = 11.7%), consists essentially of O,O-diethyl S-norbornyl phosphorothioate.

This product is useful as an insecticide.

EXAMPLE 10

This example illustrates the synthesis of O,O-diethyl S-hexyl phosphorothioate by a preferred specific embodiment of the process of this invention.

By the reaction and product separation procedures of Example 4, n-hexane (43.0 w) in carbon tetrachloride (100 v), and Example 1 product (18.0 w) in carbon tetrachloride (25 v), are reacted, and the desired end product (7.4 w), distilling at 95°–115°C. at 0.4 millimeter of mercury pressure, is obtained. This product, typically a water-white liquid analyzing: S = 12.8%, P =

13.1%, Cl = 0.79% (Calculated: S = 12.6%, P = 12.2%, Cl = 0.0%), consists essentially of O,O-diethyl S-hexyl phosphorothioate.

This product is useful as a lubricant additive.

EXAMPLE 11

This example relates to O,O-diethyl S-(2-furanylmethyl) phosphorothioate, and its synthesis by a preferred specific embodiment of the process of this invention.

By the reaction and product separation procedures of Example 4, 2-methylfuran (41.0 w) in carbon tetrachloride (100 v), and Example 1 product (18.0 w) in carbon tetrachloride (25 v) are reacted, and a crude product (10.9 w), distilling at 110°–123°C. at 0.5 millimeter of mercury pressure, typically a brown liquid, is obtained. This crude product is redistilled to give the desired end product (9.0 w), distilling at 98°–105°C. at 0.15 millimeter of mercury pressure. This end product typically is a yellow liquid analyzing: S = 13.0%, P = 13.4%, Cl = 0.17% (Calculated: S = 12.8%, P = 12.4%, Cl = 0.0%). It consists essentially of O,O-diethyl S-(2-furanylmethyl) phosphorothioate.

This product is useful as an insecticide.

EXAMPLE 12

This example illustrates O,O-diethyl S-(acetoxymethyl) phosphorothioate and its preparation by a preferred specific embodiment of the process of this invention.

By the reaction and product separation procedures of Example 4, methyl acetate (74 w) in carbon tetrachloride (125 v), and Example 1 product (18.25 w) in carbon tetrachloride (25 v) are reacted, and the desired end product (6.1 w), distilling at 117°–130°C. at 0.5–0.6 millimeter of mercury pressure, is obtained. This product, which typically analyzes: S = 13.2% (Calculated: S = 13.2%), consists essentially of O,O-diethyl S-(acetoxymethyl) phosphorothioate.

This product is useful as an insecticide.

EXAMPLE 13

This example illustrates the O,O-diethyl thiophosphorylated chlorinated camphene, and its synthesis by a preferred specific embodiment of the process of this invention.

By the reaction and product separation procedures of Example 4, chlorinated camphene (40 w) (saturated), analyzing 64% chlorine, in carbon tetrachloride (75 v), and Example 1 product (18.5% w) in carbon tetrachloride (25 v) are reacted, and the desired end product (54.4 w), distilling at 58°–84°C. at 0.25 millimeter of mercury pressure, is obtained. This product, typically a tan liquid analyzing: S = 4.4%, Cl = 49.9% (Calculated: S = 6.2%, Cl = 41.6%), consists essentially of O,O-diethyl thiophosphorylated chlorinated camphene.

This product is useful as an insecticide.

EXAMPLE 14

This example pertains to O,O-diethyl S-(2-carboxy-2-methylpropyl) phosphorothioate and its synthesis by a preferred specific embodiment of the process of this invention.

By the reaction procedure of Example 2, pivalic acid (40.8 w) in carbon tetrachloride (125 v), and Example 2 product (18.0 w) in carbon tetrachloride (25 v) are reacted. However, the reaction mixture is treated somewhat differently to obtain the desired end product. The excess pivalic acid is distilled off, and the residue (28.2 w) is dissolved in benzene (200 v). Water (50 v) is added to the benzene solution and then 1 M aqueous solution (91 v) of potassium hydroxide is added. The water layer that forms is separated and made strongly acid with 5% aqueous hydrochloric acid solution. Typically an organic layer separates. This organic layer is extracted with diethyl ether and the extract dried over sodium sulfate. The diethyl ether is removed by aspiration and the residue topped at 60°C. at less than 1 millimeter of mercury pressure. The residue (18.1 w), typically a viscous tan liquid, is the desired end product. It consists essentially of O,O-diethyl S-(2-carboxy-2-methylpropyl) phosphorothioate.

This product is useful as an insecticide.

EXAMPLES 15–49

These examples illustrate other specific embodiments of the process of this invention, and of other thiophosphorates of this invention.

By following the reaction and product separation procedures of Example 4 with Example 1 product as the thiophosphorylating agent, the corresponding thiophosphate derivatives of the following tabulated organic compounds are obtained. The utilities of these derivatives are indicated in the table.

| Example | Organic Compound | Utility of Thiophosphate Derivatives |
| --- | --- | --- |
| 15 | m-isopropylphenyl N-methyl carbamate | Insecticide |
| 16 | Adduct of norbornene and Hexachloro cyclopentadiene | Insecticide |
| 17 | dimethyl glutarate | Insecticide |
| 18 | methyl p-toluate | Insecticide |
| 19 | N-isopropyl phthalimide | Insecticide |
| 20 | p-tolyl N-methyl carbamate | Insecticide |
| 21 | m-tolyl N-methyl carbamate | Insecticide |
| 22 | p-isopropylphenyl N-methyl carbamate | Insecticide |
| 23 | bornyl chloride | Insecticide |
| 24 | durene | Lubricant additive |
| 25 | mesitylene | Lubricant additive |
| 26 | dimethyl sebacate | Insecticide |
| 27 | methyl decanoate | Lubricant additive |
| 28 | methyl stearate | Lubricant additive |
| 29 | N,N-diethyl-m-toluamide | Lubricant additive |
| 30 | α,α-dimethylpentanoic acid | Insecticide |
| 31 | methyl o-toluate | Insecticide |
| 32 | 2,4-dichlorotoluene | Insecticide |
| 33 | 3,4-dichlorotoluene | Insecticide |
| 34 | dioxane | Insecticide |
| 35 | 2,3-dichlorodioxane | Insecticide |
| 36 | tetrahydrodicyclopentadiene | Insecticide |
| 37 | N-methylphthalimide | Insecticide |
| 38 | tetrahydrofuran | Insecticide |
| 39 | β-methylnaphthalene | Lubricant additive |
| 40 | 2-methylthiophene | Insecticide |
| 41 | p-menthane | Insecticide |
| 42 | decahydronaphthalene | Insecticide |
| 43 | O,O,O-triethyl phosphorothioate | Lubricant additive |
| 44 | indane | Insecticide |
| 45 | cumene | Insecticide |
| 46 | N,N-dimethylpivalamide | Insecticide |
| 47 | 1,1,1,5-tetrachloropentane | Insecticide |
| 48 | methyl 4-chlorobutyrate | Insecticide |
| 49 | 1,4-dichlorobutane | Insecticide |

EXAMPLE 50

This example illustrates how to make O,O-diethyl S-benzyl phosphorodithioate by a preferred specific embodiment of the process of this invention.

A dithiophosphorylation agent consisting essentially of O,O-diethyl S-(chlorophosphorodithioate) is made by the procedure of Almasi and Paskucz, Chem. Ber. 98, 613 (1965).

Following the reaction and product separation procedures of Example 4, toluene (56.8 w) in carbon tetrachloride (125 v), and the dithiophosphorylating agent (16.5 w) in carbon tetrachloride (25 v) are reacted and the desired end product is obtained. This product consists essentially of O,O-diethyl S-benzyl phosphorodithioate.

This product is useful as an insecticide.

Thus, this invention provides a new and useful process, and new and useful compounds.

Other features, advantages and specific embodiments of this invention will be readily apparent to those exercising ordinary skill in the art after reading the foregoing disclosures. Such specific embodiments are within the scope of the claimed subject matter, unless otherwise expressly indicated. Also, while specific embodiments of this invention have been described in considerable detail, variations and modifications of them can be effected without departing from the spirit and scope of the invention substantially as disclosed and claimed.

The term "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

What I claim and desire to protect by letters Patent is:

1. A process for thiophosphorylating a saturated carbon of an organic compound, which carbon is characterized by at least one hydrogen radical replaceable under free radical conditions, which comprises effecting by free radical catalysis at about 0°–150°C. reaction of said organic compound and a halothiophosphate of the formula

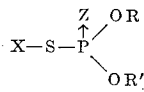

wherein X is a halo radical, Z is selected from the group consisting of the oxo and thioxo radicals, and R and R' are organic radicals.

2. A process according to claim 1, wherein said free radical catalysis is obtained at least by admixing said organic compound and halothiophosphate with an effective quantity of free radical generating material.

3. A process according to claim 2, wherein said free radical generating material comprises an organic peroxide.

4. A process according to claim 1, wherein X is the chloro radical, Z is the oxo radical, and R and R' are $C_1$–$C_7$ alkyl radicals.

5. A process according to claim 4, wherein said organic compounds is a hydrocarbon.

6. A process according to claim 5, wherein said organic compound is n-hexane.

7. A process according to claim 5, wherein said organic compound is cyclohexane.

8. A process according to claim 5, wherein said organic compound is cyclopentane.

9. A process according to claim 5, wherein said organic compound is toluene.

10. A process according to claim 5, wherein said organic compound is a xylene selected from the group consisting of o-, m- and p-xylenes.

11. A process according to claim 5, wherein said organic compound is mesitylene.

12. A process according to claim 5, wherein said organic compound is norbornane.

13. A process according to claim 5, wherein said organic compound is p-menthane.

14. A process according to claim 4, wherein said organic compound is a heterocyclic compound.

15. A process according to claim 14, wherein said organic compound is 2-methylfuran.

16. A process according to claim 14, wherein said organic compound is 2-methylthiophene.

17. A process according to claim 14, wherein said organic compound is dioxane.

18. A process according to claim 4, wherein said organic compound is methyl acetate.

19. A process according to claim 4, wherein said organic compound is pivalic acid.

20. O,O-Di($C_1$–$C_7$ alkyl) S-($C_1$–$C_7$ alkylbenzyl) phosphorodithioates.

21. O,O-Di($C_1$–$C_7$ alkyl) S-norbornyl phosphorodithioates.

22. O,O-Di($C_1$–$C_7$ alkyl) thio and dithiophosphorylated chlorinated camphenes.

23. O,O-Di($C_1$–$C_7$ alkyl) S-(2-carboxy-2-methylpropyl) phosphorothioates and dithioates.

24. A process for thiophosphorylating a saturated carbon of an organic compound, which carbon is characterized by at least one hydrogen radical replaceable under free radical conditions, which comprises exposing at 0-150°C. to ultraviolet light a mixture of said organic compound and a halothiophosphate of the formula:

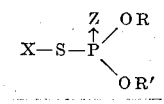

wherein X is halo, Z is selected from the group consisting of oxo and thioxo, and R and R' are organic radicals.

* * * * *